United States Patent [19]
Yamakita

[11] Patent Number: 6,148,287
[45] Date of Patent: *Nov. 14, 2000

[54] VOICE DATA TRANSMISSION/STORAGE SYSTEM

[75] Inventor: Tooru Yamakita, Fussa, Japan

[73] Assignee: Casio Computer Co., Ltd., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/943,752

[22] Filed: Oct. 3, 1997

[30] Foreign Application Priority Data

Oct. 15, 1996 [JP] Japan .................................... 8-272455
Jul. 14, 1997 [JP] Japan .................................... 9-188172

[51] Int. Cl.$^7$ ............................. G10L 15/22; H04M 1/64
[52] U.S. Cl. .................. 704/275; 379/88.04; 379/88.23; 379/88.25
[58] Field of Search ................................... 704/246, 270, 704/275, 277; 379/88.01, 88.02, 88.03, 88.04, 88.25, 88.22, 88.23, 88.27, 67.1, 68, 69, 74, 76, 79, 80

[56] References Cited

U.S. PATENT DOCUMENTS

| | | | |
|---|---|---|---|
| 4,712,243 | 12/1987 | Ninomiya et al. . | |
| 4,882,744 | 11/1989 | Hashimoto | 379/88.15 |
| 4,964,156 | 10/1990 | Blair | 379/189 |
| 5,117,460 | 5/1992 | Berry et al. | 704/275 |
| 5,371,901 | 12/1994 | Reed et al. | 704/275 |
| 5,418,835 | 5/1995 | Frohman et al. | 455/413 |
| 5,444,768 | 8/1995 | Lemaire et al. | 379/68 |
| 5,475,798 | 12/1995 | Handlos | 704/277 |
| 5,497,413 | 3/1996 | Nakano | 379/88.2 |
| 5,511,111 | 4/1996 | Serbetcioglu et al. | 379/88.01 |
| 5,572,576 | 11/1996 | Klausner et al. | 379/88.11 |
| 5,583,919 | 12/1996 | Talvard et al. | 379/88.04 |
| 5,584,052 | 12/1996 | Gulau et al. | 704/275 |
| 5,610,973 | 3/1997 | Comer | 455/413 |
| 5,704,009 | 12/1997 | Cline et al. | 704/275 |
| 5,711,011 | 1/1998 | Urs et al. | 379/88.25 |
| 5,721,537 | 2/1998 | Protas | 379/70 |
| 5,737,491 | 4/1998 | Allen et al. | 704/275 |
| 5,745,551 | 4/1998 | Strauch et al. | 455/413 |
| 5,758,332 | 5/1998 | Hirotani . | |
| 5,797,098 | 8/1998 | Schroeder et al. | 379/355 |
| 5,797,124 | 8/1998 | Walsh et al. | 704/275 |
| 5,799,063 | 8/1998 | Krane | 379/88.17 |
| 5,905,774 | 5/1999 | Tatchell et al. | 379/88.04 |
| 5,926,524 | 7/1999 | Taylor | 379/88.08 |

*Primary Examiner*—David R. Hudspeth
*Assistant Examiner*—Martin Lerner
*Attorney, Agent, or Firm*—Frishauf, Holtz, Goodman, Langer & Chick, P.C.

[57] ABSTRACT

A voice data storage system includes a network connected to a portable portable terminal, and a voice data storage computer for, when voice data fetched by a microphone of the portable terminal is received through the network, storing the voice data together with a keyword in correspondence with the portable terminal which has fetched the voice data. To read out the stored voice data, a keyword is input from the portable terminal to request, through the network, the voice data storage computer to retrieve the voice data. The voice data storage computer retrieves the voice data on the basis of the keyword and transmits the corresponding voice data to the portable terminal.

11 Claims, 8 Drawing Sheets

LAN CONTROL DATA: DATA FOR SENDING DATA TO TARGET TERMINAL (VOICE DATABASE PERSONAL COMPUTER OR THE LIKE) THROUGH NETWORK
COMMAND: INSTRUCTION FOR VOICE DATABASE PERSONAL COMPUTER
DATA: DATA CORRESPONDING TO COMMAND

VOICE DATA TRANSMISSION/STORAGE SYSTEM

BACKGROUND OF THE INVENTION

The present invention relates to a terminal connected to a network system such as a local area network (LAN) or a wide area network (WAN) and, more particularly, to a voice data storage system for storing voice information from a terminal in a host computer through a network.

Along with recent advances in integration technology, a demand for further size reduction has arisen. For example, there is a requirement for performing processing in a personal computer or the like using a portable compact terminal, e.g., a portable terminal. A conventional operation of inputting data from a keyboard or outputting data to a display needs a memory or auxiliary storage unit having a relatively small capacity. However, a large-capacity memory is required to process voice information.

In addition to the above-described voice data input/output operation, a voice memo function is often available for the operator to store information as voice data instead of inputting the information via the keyboard. This voice memo function also requires a large-capacity memory to store large amounts of voice data.

Conventionally, to store voice data in a compact portable terminal or the like, a large-capacity memory is necessary. In addition, since the portable terminal is equipped with an auxiliary storage unit such as a magnetic storage unit, the size of the terminal cannot be reduced.

BRIEF SUMMARY OF THE INVENTION

It is an object of the present invention to provide a system for automatically analyzing an outdoor action and recording it as an action record without any cumbersome recording operation.

To achieve the above object, there is provided a voice data storage system, wherein voice data transmitted through a communication control unit of a terminal is stored in a voice data storage computer connected to a network in correspondence with a keyword obtained by recognizing part of the voice data input from the terminal, the terminal comprising a microphone for inputting the voice data, a loudspeaker for outputting the voice data, and the communication control unit for network connection, and transmitting the voice data input from the microphone.

According to the present invention, since the terminal does not need a large-capacity memory to store voice data, the size of the terminal can be reduced. In addition, since the voice data input amount is not limited, necessary voice data can be recorded anytime and anywhere without considering the capacity. Furthermore, the recorded voice data can be read out and reproduced in the terminal by designating a keyword such as voice data. Therefore, the voice data can be freely reproduced and used anytime as needed.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

The embodiment of the present invention will be described below with reference to the several views of the accompanying drawing.

Figure 1:
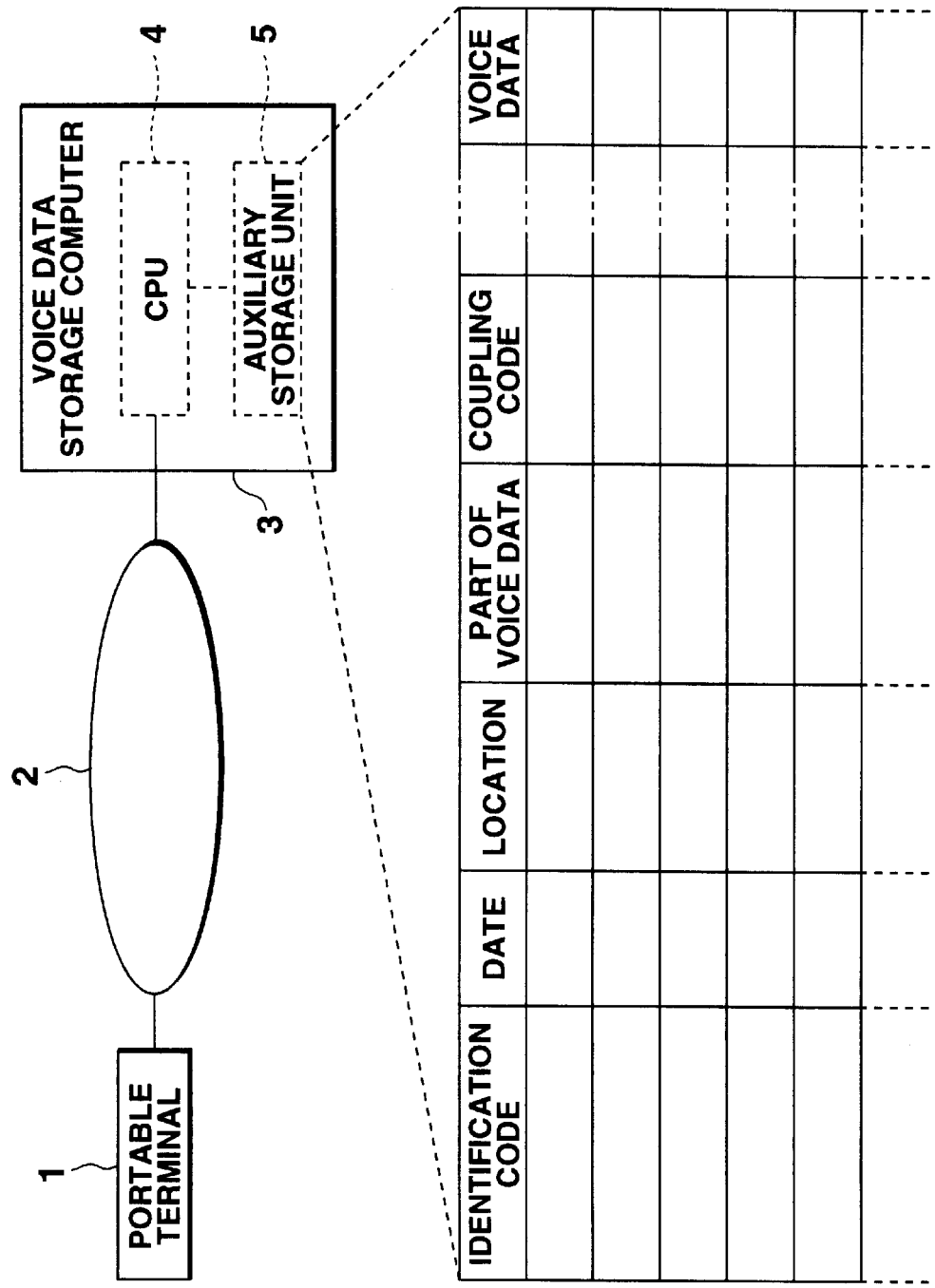
FIG. 1 is a view showing the arrangement of an embodiment.

FIG. 1 is a view showing the arrangement of the embodiment.

A portable terminal 1 is a portable terminal having an interface connected to a network 2. The network 2 is, e.g., a local area network or a wide area network connected to a plurality of portable terminals 1.

A voice data storage computer 3 comprises a CPU 4 and an auxiliary storage unit 5 and is connected to the network 2 through an interface. When voice data is supplied from the microphone of the portable terminal 1 through the network, the voice data storage computer 3 fetches the voice data, makes it to correspond to the portable terminal, and stores the voice data in the auxiliary storage unit 5 together with a keyword such as a date, a location, or part of voice data. When a voice data transfer request is issued, the voice data storage computer 3 transfers the voice data to the portable terminal which has issued the request.

The CPU 4 controls the voice data storage computer 3. The auxiliary storage unit 5 stores the identification code of the portable terminal, the date, the location, part of recognized voice data, and voice data. The voice data may be either voice-recognized data or voice data itself before recognition.

When the portable terminal 1 issues a recording request, the voice data storage computer 3 stores voice data sent from the portable terminal 1 together with a keyword such as the identification code of the portable terminal, a date, a location, or part of voice data.

When a request for reading out stored voice data is received from the portable terminal 1 through the network 2, the voice data storage computer 3 retrieves, from information stored in the auxiliary storage unit 5, information having the same identification code as that of the portable terminal which has issued the request on the basis of a designated keyword, and sends the target voice data to the portable terminal 1 through the network 2. The portable terminal 1 outputs the information from a loudspeaker.

The portable terminal 1 need not incorporate a memory for storing voice data. Since information of, e.g., one frame suffices, the function of the portable terminal itself can be reduced.

Figure 2:
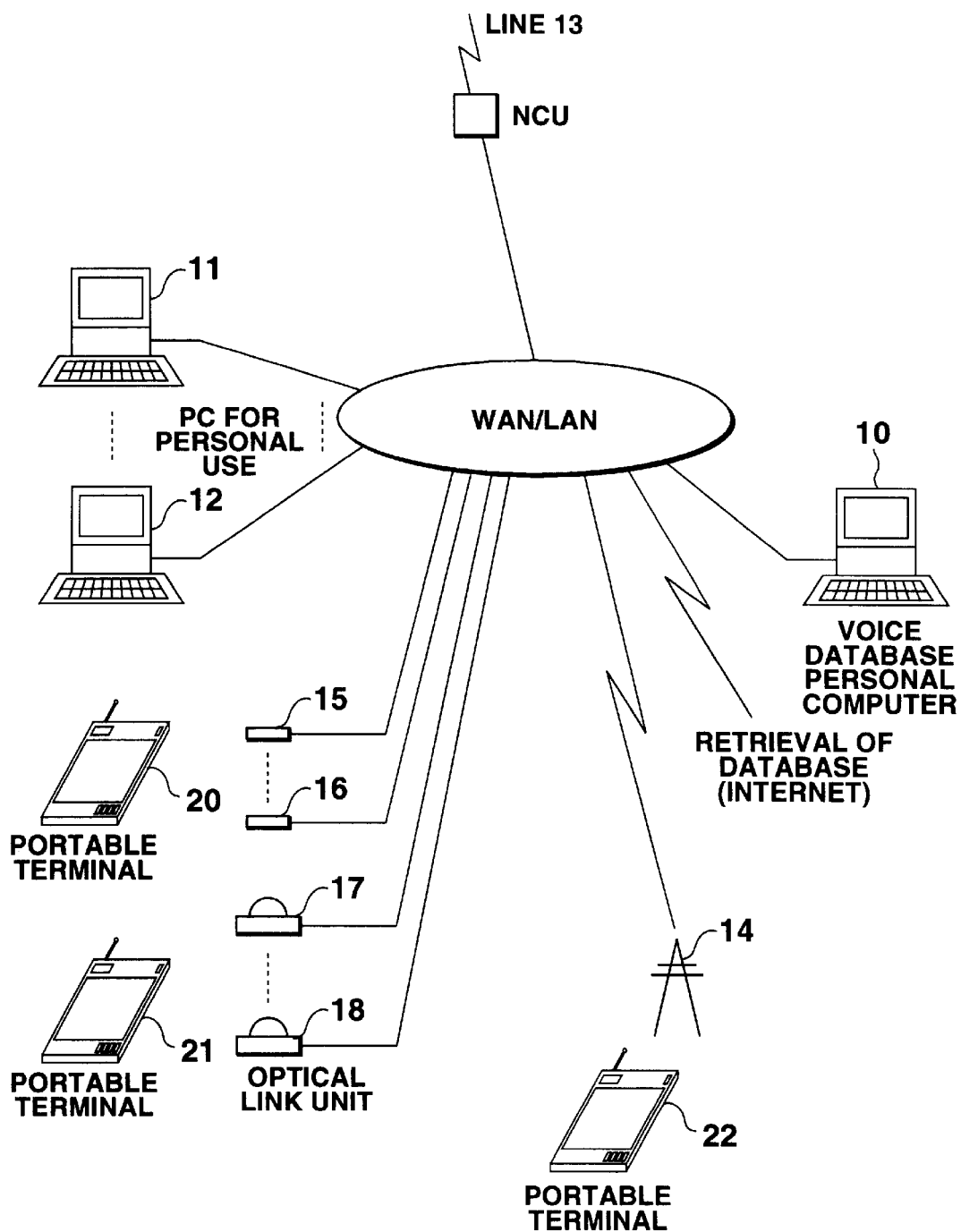
FIG. 2 is a view showing the system configuration of the embodiment.

FIG. 2 is a view showing the system configuration of this embodiment. A voice database personal computer 10 and personal computers 11 and 12 for personal use are connected to a wide area network (WAN) or a local area network (LAN). A line 13 connected to another network, an antenna base station 14 for radio communication, and terminals 15 and 16 and optical link units 17 and 18 for connecting portable terminals operated in the area are also connected to the WAN/LAN. Portable terminals 20, 21, and 22 can be connected to the WAN/LAN in the area such that optical communication can be performed through the second connection terminals 15 and 16 or the optical link units 17 and 18, or radio communication with the antenna base station 14 is enabled.

Each of the personal computers 10, 11, and 12 in the system has a storage unit. This storage unit has a recording medium storing a program and data in advance. The recording medium is constituted by a magnetic or optical recording medium or a semiconductor memory. This recording medium is permanently incorporated or detachably mounted in the storage unit. The program and data to be recorded on the recording medium may be received from another device connected through a communication line or the like, and stored. Alternatively, a storage unit having the recording medium may be arranged on the side of another device connected through the communication line or the like, and a program and data stored in the recording medium may be used through the communication line.

Figure 3:
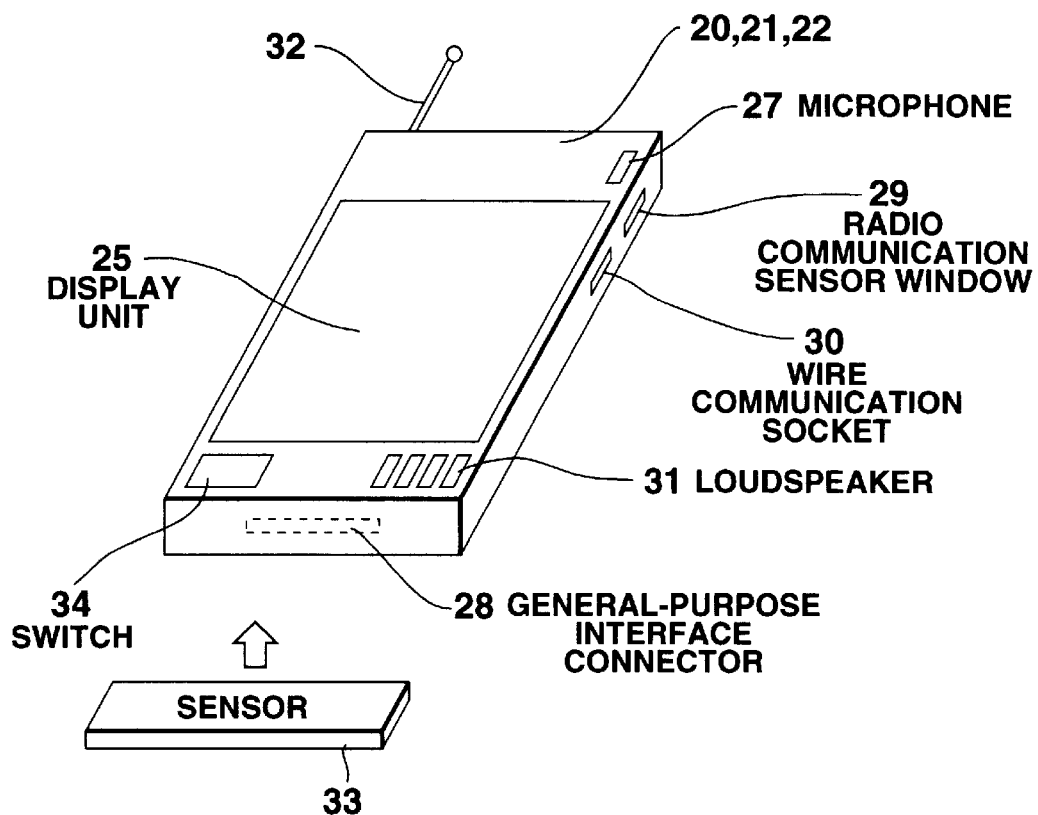
FIG. 3 is a perspective view showing the outer appearance of a portable terminal of the embodiment.

FIG. 3 shows details of each of the portable terminals 20, 21, and 22. Each of the portable terminals 20, 21, and 22 has a display unit 25 constituted by an LCD, a camera 26, a microphone 27, a generalpurpose interface connector 28, a radio (optical) communication sensor window 29, a wire communication socket 30, a loudspeaker 31, and a radio communication antenna 32. The general-purpose interface connector 28 is connected to a unit 33 such as a sensor, e.g., a temperature sensor or a humidity sensor, or a GPS for obtaining the current position. The portable terminal also has a switch 34 for recording voice data from the microphone 27 in the depressed state.

Figure 4:
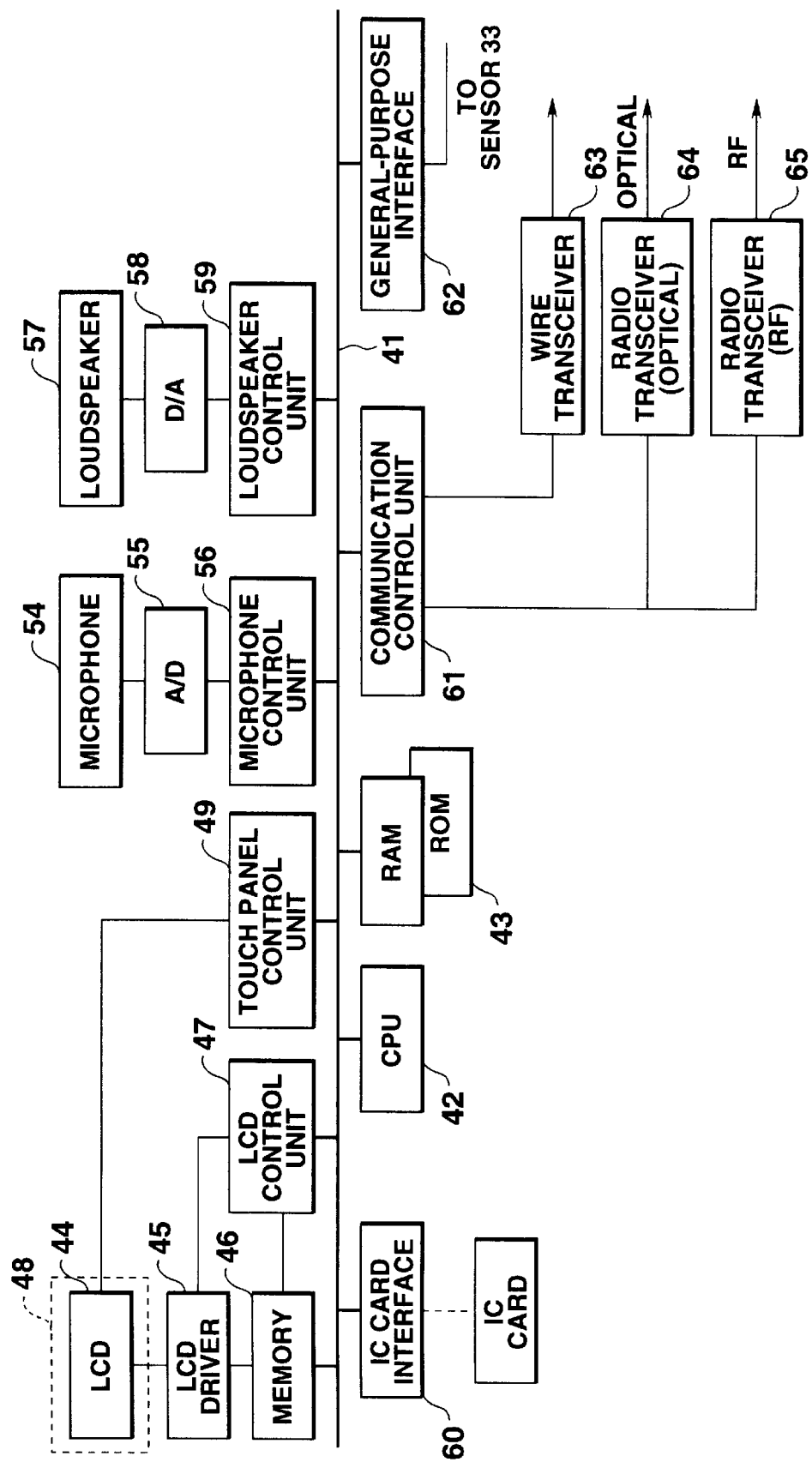
FIG. 4 is a block diagram of the portable terminal of the embodiment.

FIG. 4 is a block diagram of the portable terminal. A CPU 42 and a memory (RAM and ROM) 43 are connected to a bus line 41. Basically, the CPU 42 executes a program stored in the ROM of the memory 43. This program need not always be stored in the ROM. For example, the program may be stored in the storage unit, and loaded and executed as needed. The storage unit has a recording medium storing a program and data in advance. The recording medium is constituted by a magnetic or optical recording medium or a semiconductor memory. This recording medium is permanently incorporated or detachably mounted in the storage unit. The program and data to be recorded in the recording medium may be received from another device connected through a communication line or the like, and stored. Alternatively, a storage unit having the recording medium may be arranged on the side of another device connected through the communication line or the like, and a program and data stored in the recording medium may be used through the communication line.

Input/output terminals corresponding to the display unit 25, the microphone 27, and the loudspeaker 31 of the portable terminal shown in FIG. 3 are also connected to the bus 41. An LCD 44 is connected to a memory 46 through an LCD driver 45. The LCD driver 45 is a drive circuit for outputting display information stored in the memory 46 to the LCD 44 and displaying the information on the LCD 44. The memory 46 is connected to the bus 41 to display, on an LCD 48, information written by the CPU 42 through the bus. Display on the LCD 44 is controlled by an LCD control unit 47. The LCD control unit 47 is connected to the bus 41 and operates on the basis of an instruction from the CPU 42.

The touch panel 48 is arranged on the front surface portion of the LCD 44. The position information of a finger touching the panel is obtained by a touch panel control unit 49. The touch panel control unit 49 is connected to the bus 41, so that the position information or the like is read under the control of the CPU 42 through the bus 41.

The output from a microphone 54 is supplied to an A/D converter 55, converted into digital data, and supplied to a microphone control unit 56. The microphone control unit is a circuit for converting voice information input from the microphone into digital data. For example, the microphone control unit fetches voice data received at a specific period under the control of the CPU 42, compresses the voice data on the basis of ADPCM or the like, and transfers the voice data to the voice database personal computer 10.

A loudspeaker control unit 59 is connected to a D/A converter 58. The D/A converter outputs an analog signal corresponding to digital data output from the loudspeaker control unit 59. The D/A converter 58 is connected to a loudspeaker 57. The loudspeaker 57 outputs the analog signal from the D/A converter 58 as a voice output.

The microphone control unit 56 and the loudspeaker control unit 59 are connected to the bus 41. Voice data from the microphone is fetched under the control of the CPU 42, and the loudspeaker control unit 59 outputs the voice information to the loudspeaker under the control of the CPU 42.

An IC card interface 60, a communication control unit 61, and a general-purpose interface 62 are also connected to the bus 41. The IC card interface 60 is used to connect an IC card. The IC card is used as an auxiliary storage unit.

The communication control unit 61 connected to the bus 41 is a control unit for communication. A wire transceiver 63, a radio transceiver (optical) 64, and a radio transceiver (RF) 65 are connected to the communication control unit 61. The wire transceiver 63 comprises a modem for the network and is connected to the terminal 15 or 16 of the WAN/LAN shown in FIG. 2. The radio transceiver (optical) optically links to the optical link unit 17 or 18 to transmit/receive data. The radio transceiver 65 is connected to the antenna 32 to perform communication using a radio wave with the base station 14. Such communication of various types (radio, optical, wire) are enabled under the control of the communication control unit 61 connected to the bus 41.

The general-purpose interface 62 is connected to the sensor 33 such as a temperature sensor, a humidity sensor, or a GPS to fetch data corresponding to input sensor information. For a GPS, the current position of the portable terminal is input. When the portable terminals 20, 21, and 22 are connected to the radio communication antenna 14, data fetched from the GPS is connected to the LAN through the antenna 14, so that the current positions of the portable terminals are recognized in the area. More specifically, the position of the user of each portable terminal is sequentially fetched to recognize the action of the user. The CPU 42 incorporates a timepiece circuit for updating the current date.

The portable terminal of the embodiment of the present invention stores the program to be executed in the ROM. However, the present invention is not limited to this, and the program may be stored in, e.g., a compact auxiliary storage unit.

In the embodiment of the present invention, data to be transmitted from the portable terminal has a frame structure.

Figure 5:
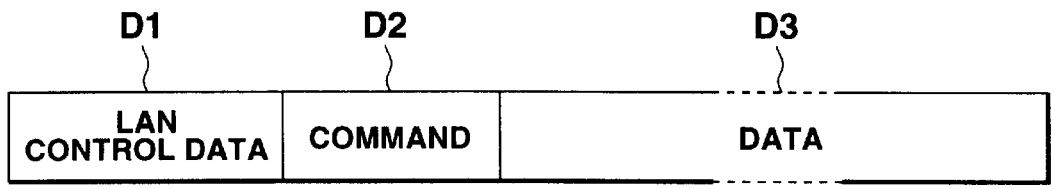
FIG. 5 is a view showing the structure of a frame sent from the portable terminal.

FIG. 5 is a view showing the structure of a frame sent from the portable terminal. A frame sent from one of the portable terminals 20, 21, and 22 comprises local area network (LAN) control data D1, a command D2, and data D3. The LAN control data D1 is used to send data or the like to a target terminal through the local area network. The address of an input network in the area, the address of the portable terminal as a transmission source, and the like are stored in the local area network control data D1. The command D2 represents an instruction for the destination of the sent data, i.e., the destination address stored in the local area network control data D1. The data D3 is data corresponding to the command D2, e.g., a keyword or voice data. The local area network control data applies not only to the local area network but also to a wide area network.

Figure 6:
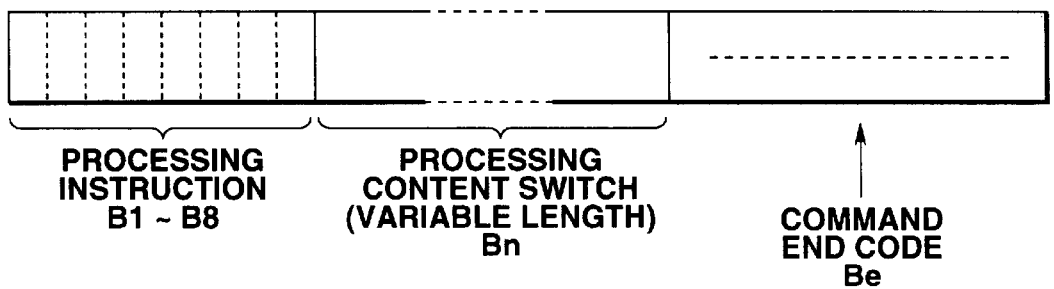
FIG. 6 is a view showing a command bit structure.

FIG. 6 is a view showing a command bit structure. The command comprises processing instruction bits B1 to B8, a processing content switch B$n$, and a command end code B$e$. The processing content switch B$n$ is switch information representing a detailed instruction corresponding to the command and has a variable length.

In the embodiment of the present invention, when the portable terminal requests processing, the processing is performed through the voice database personal computer 10 in many cases. For personal information, the personal computer 11 or 12 for personal use is connected to the portable terminal through the local area network.

The portable terminals 20, 21, and 22 of the present invention execute processing in correspondence with an event. For example, when the state changes, e.g., data is input from the touch panel, or a file is transmitted from the local area network, a corresponding program is executed.

The voice database personal computer 10 stores voice information corresponding to a portable terminal. For example, a keyword such as a date, time, or a location and part of voice data are stored as a keyword in correspondence with an identification code. That is, the voice database personal computer 10 stores information such as an identification code in correspondence with a portable terminal. The identification code is the code unique to the portable terminal and corresponds to the transmitted address of the portable terminal as a transmission source. The identification code is used for retrieval when voice data from the portable terminal is to be stored as voice memo. The voice database personal computer 10 has a large-capacity hard disk as an auxiliary storage unit. The compressed voice data is stored in this hard disk.

The present invention will be described below in more detail with reference to flow charts.

Figure 7:
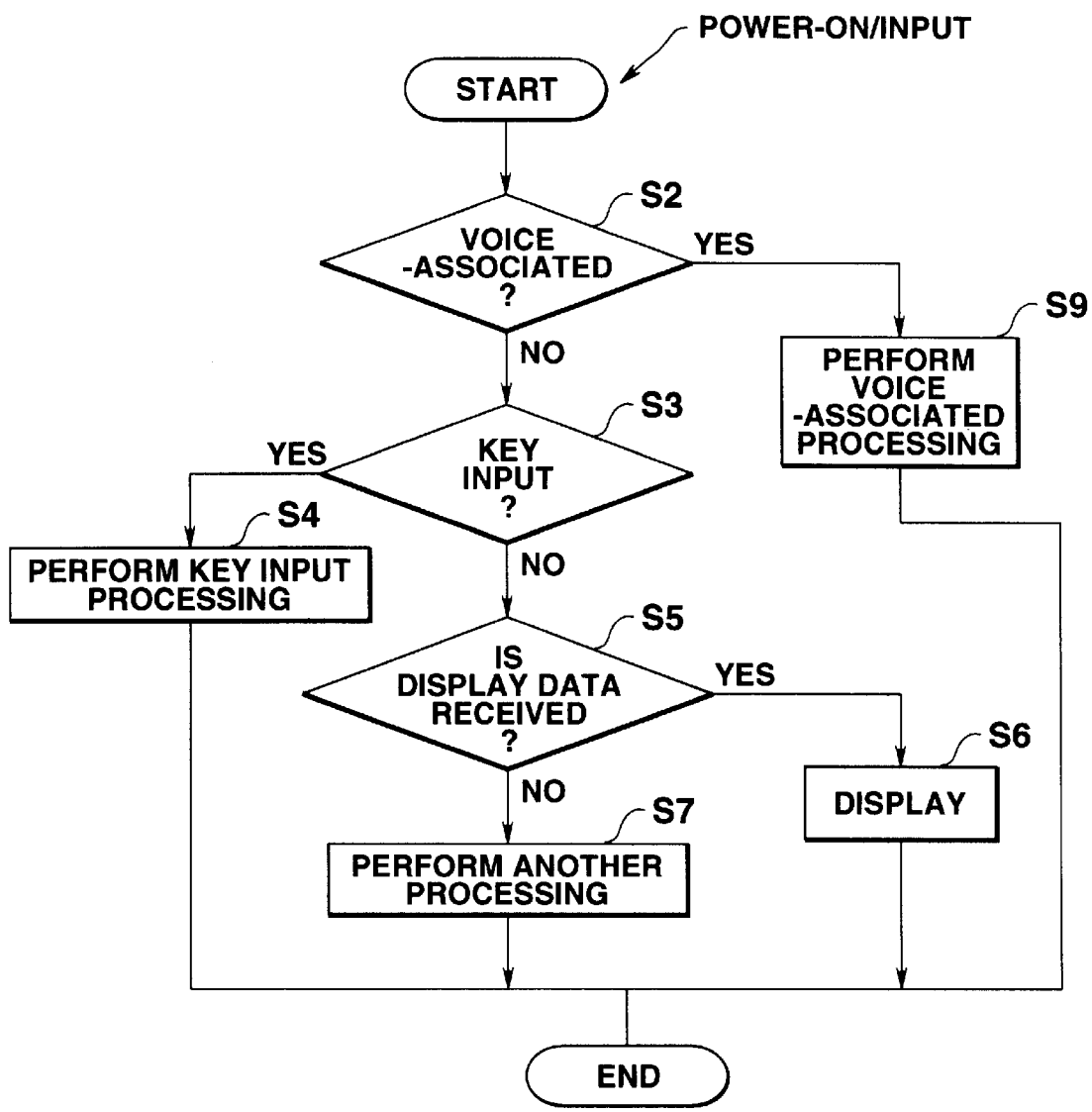
FIG. 7 is a flow chart of processing in the portable terminal.

FIG. 7 is a flow chart of processing in the portable terminal. The program for realizing functions shown in this flow chart is stored in a recording medium such as a ROM in the form of a CPU-readable program code. When a key input instruction, i.e., an input from the touch panel or an input as a result of voice recognition is generated upon power ON, this processing starts.

It is determined in step S2 whether the instruction is associated with voice data. The presence/absence of an instruction for recording, retrieving, or deleting voice data is determined. These instructions are input by the operator from the touch panel.

If NO in step S2, it is determined in step S3 whether the instruction is a key input instruction (including voice recognition, i.e., a result of voice recognition) for an application or the like. If YES in step S3, key input processing (S4) is executed. If NO in step S3, it is determined in step S5 whether display data is received, i.e., display data as a frame is received. If YES in step S5, display processing (S6) is executed to display the display data. If NO in step S5, another processing (S7) is executed.

If YES in step S2, voice-associated processing (S9) is executed. This voice-associated processing (S9) is processing of causing the A/D converter 55 to convert a voice signal input from the microphone 54 into digital data, and causing the microphone control unit 56 to fetch and transmit the obtained voice data, or processing of outputting data retrieved by the voice database personal computer 10.

Figure 8:
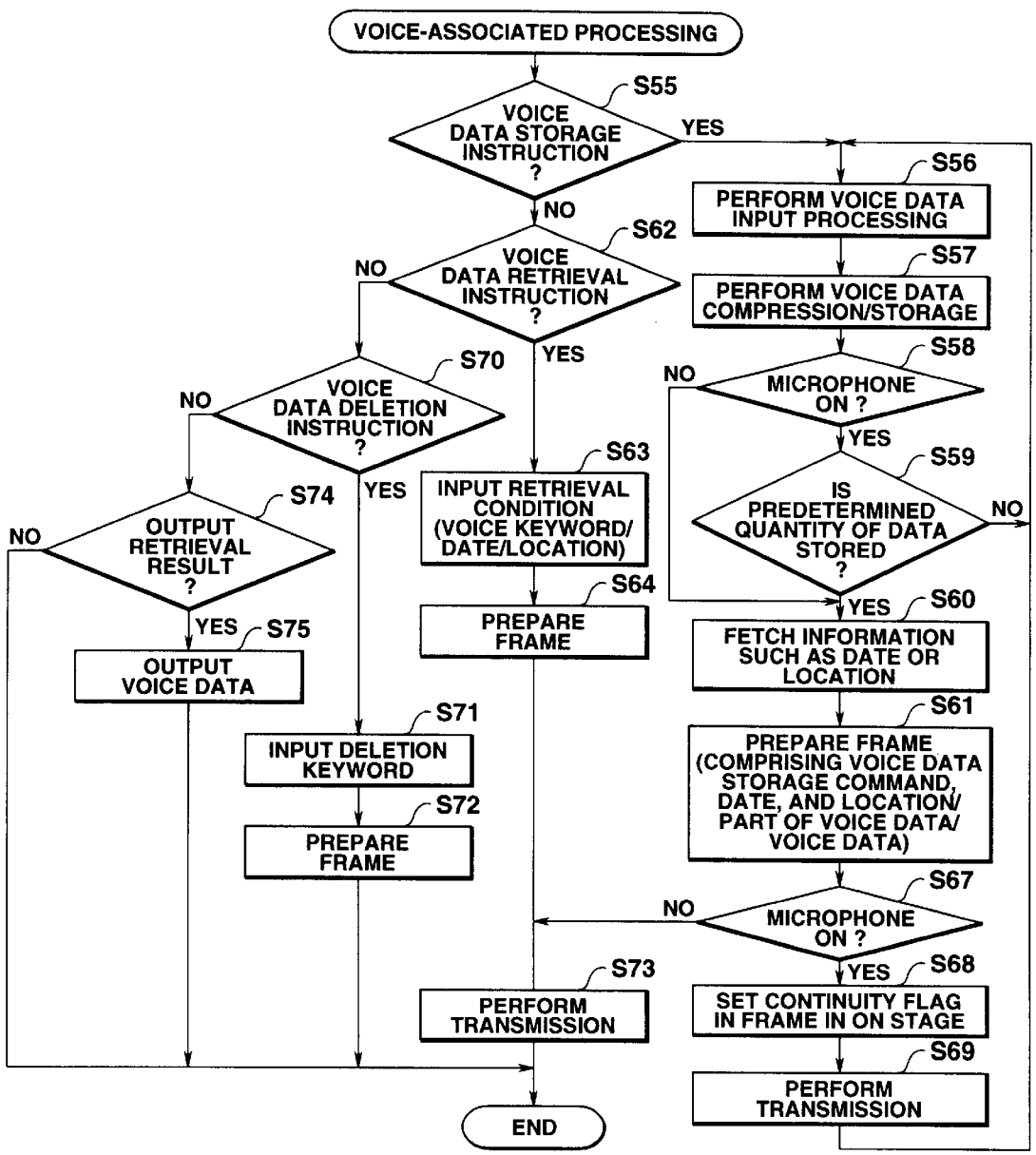
FIG. 8 is a flow chart of voice-associated processing.

FIG. 8 is a flow chart showing voice-associated processing (S9) in the portable terminal in more detail. The program for realizing functions shown in this flow chart is stored in a recording medium such as a ROM in the form of a CPU-readable program code. If it is determined in step S2 that the instruction is associated with voice data, this processing starts.

It is determined in step S55 whether the switch 34 is being depressed and a voice data recording instruction is generated. If YES in step S55, voice input processing is performed in step S56. For example, voice data in a specific time unit is input. When this processing is ended, processing of compressing the input voice data and storing the voice data in the memory of the portable terminal is performed in step S57.

Upon completing the storage processing, it is determined in step S58 whether the switch 34 is continuously being operated and the microphone is ON. If YES in step S58, it is determined in step S59 whether a predetermined quantity of data is stored. If NO in step S58, the predetermined quantity of data has not been stored yet although the microphone is ON. Processing from step S56 is performed again to store subsequent voice data.

If the microphone is not ON (NO in step S58), or if the predetermined quantity of data has already been stored (YES in step S59), information such as a date or a location is fetched in step S60. In this processing, current information such as position information from the sensor 33 or current time from the timepiece circuit is written. In step S61, a frame comprising a voice data storage command, a keyword, a date, and a location corresponding to the voice data, and the voice data is prepared.

Upon completing preparation of the frame, it is determined in step S67 again whether the microphone is ON. In the system of the embodiment of the present invention, data is transferred in units of frames. For this reason, when a predetermined quantity of data is stored, a corresponding frame is prepared and transferred, and at the same time, next voice data is fetched. For this purpose, it is determined in step S67 whether the microphone is ON. If YES in step S67, a continuity flag in the prepared frame is set in the ON state because subsequent voice data is present. This continuity flag is prepared as a continuity code (start address at which voice data next to the voice data is to be stored) in the voice database.

After step S68, the prepared frame is transmitted to the voice database personal computer 10 in step S69, and processing from step S56 is executed again.

If NO in step S55, it is determined in step S62 whether the instruction is a voice data retrieval instruction. If YES in step S62, i.e., the instruction is input from a voice data retrieval key (not shown) displayed on the touch panel screen, a retrieval condition is input in step S63. The condition is a voice keyword, a date, a location, or the like. The voice keyword is input from the microphone as keyword voice data, and a retrieval condition such as a date or a location is input by designating character/number keys displayed on the touch panel screen. A frame comprising the keyword and a voice data retrieval command is prepared in step S64 and transmitted in step S73.

If NO in step S62, it is determined in step S70 whether the instruction is a voice data deletion instruction. If the instruction is input from a voice data deletion key (not shown), voice data to be deleted is input and designated, and a keyword is input in step S71. The voice data to be deleted is designated using the above-described voice keyword, date, location, or the like, or a combination of these conditions. A frame including the designated keyword and a voice data deletion command is prepared in step S72 and transmitted in step S73.

In step S74, it is determined whether a retrieval result output command is included in the command portion of the frame received from the voice database personal computer 10. If YES in step S74, the received voice data is output from the loudspeaker 31 in step S75.

If NO in step S67, a frame is transmitted in step S73. After step S73 or S75, the voice-associated processing is ended.

Figure 9:
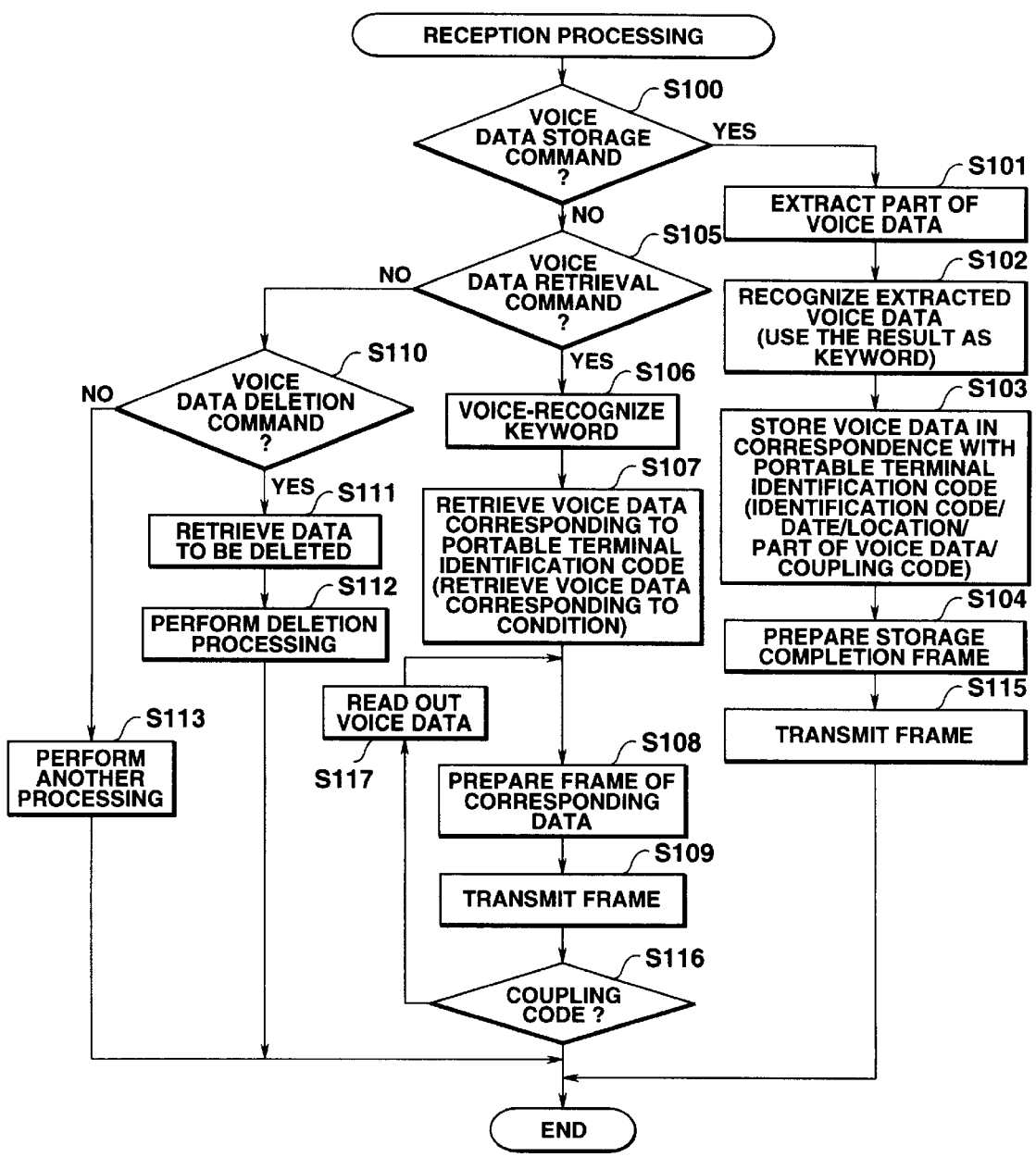
FIG. 9 is a flow chart of reception processing in voice database personal computer.

FIG. 9 is a flow chart of reception processing in the voice database personal computer 10. The program for realizing functions shown in this flow chart is stored in a recording medium of the voice database personal computer 10 in the form of a program code which can be read by a CPU in the voice database personal computer 10. Upon receiving a frame, processing shown in the flow chart of FIG. 9 starts. The command in the received frame is detected. It is determined in step S100 whether the command is a voice data storage command. If YES in step S100, part of voice data is extracted in step S101. Extraction of the voice data is executed to store, as a keyword, voice information for, e.g., one second after the start or information before the voice data temporarily intermits. For example, voice data such as "○○ conference" or "in XX city" is generated. Not voice data at the start but part of voice data at the end may be used as a keyword. Alternatively, voice data to be used as a keyword may be designated. This designation can be realized by, e.g., setting, as a keyword, voice data which has been input while a specific key is being depressed. The extracted voice data is recognized in step S102, and the recognition result is used as a keyword.

When recognition of the extracted voice data is ended, the voice data is stored in correspondence with the portable terminal identification code in step S103. Data are stored in the order of the voice data, the portable terminal identification code, the keyword such as a date, a location, or part of voice data, and the voice data. When storage processing is normally ended, a voice data storage completion frame is prepared in step S104. When the continuity flag is ON, an area where the next data is to be stored is ensured, and the start address of the area is stored in the area of a coupling code. In step S115, the prepared storage completion code is returned to the portable terminal which has transmitted the voice data storage command.

When NO in step S100, it is determined in step S105 whether the command is a voice data retrieval command. If YES in step S105, voice data input as a keyword is recognized in step S106.

In step S107, voice data having a keyword including voice data which has been recognized in step S106 is retrieved from voice data stored in correspondence with the identification code of the portable terminal which has issued the request. Voice data corresponding to the condition is obtained. Since the keyword can be designated as voice data, no cumbersome keyword input operation is required. When the keyword is not input as voice data, the voice data is retrieved on the basis of another keyword such as a date or a location. When the keyword is input from keys, recognition in step S106 can be omitted.

When processing in step S107 is ended, a frame comprising voice data as a retrieval result and a retrieval result output command is prepared in step S108. In step S109, the frame is transmitted to the portable terminal which has transmitted the voice data retrieval command.

The presence/absence of a coupling code is determined in step S116. If the coupling code is present, next voice data is read out in step S117 on the basis of the coupling code, and processing in steps S108 and S109 is executed. When no subsequent voice data is detected anymore, processing is ended.

If NO in step S105, it is determined in step S110 whether the command is a voice data deletion command. In the embodiment of the present invention, registration and deletion of voice data can be performed in units of users, i.e., portable terminals. Determination of data deletion in step S110 is performed due to this reason.

If YES in step S110, retrieval of data to be deleted is executed in step S111, and subsequently, processing of deleting the retrieved voice data is performed in step S112.

Upon completion of deletion in step S112 or completion of another processing (step S113) performed if NO in step S110, the entire processing is ended.

The embodiment of the present invention has been described above in detail. The present invention is not limited to the above embodiment. In the embodiment, voice data is stored and managed by the voice database personal computer 10. However, voice data may be stored and managed by the personal computers 11 and 12 for personal use. When the portable terminals and personal computers for personal use can be made to correspond in a one-to-one manner, the identification codes of the terminals need not be stored. In addition, the terminals are not limited to the portable type and may be set at predetermined positions.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A portable terminal apparatus adapted to be connected through a network to a voice data base apparatus for storing and retrieving voice data, said portable terminal apparatus comprising:

a voice input device;

a voice output device;

a frame processing device configured to create a frame in response to a storage instruction from a user of the portable terminal apparatus and to send the frame to the voice data base apparatus, said frame including voice data input from the voice input device, an identification code of the portable terminal apparatus, and a storage command for causing the voice data base apparatus to store the input voice data with the identification code;

is a retrieval controller configured to send the identification code and a retrieval command to the voice data base apparatus in response to a retrieval instruction from the user of the portable terminal apparatus, said retrieval command causing the voice data base apparatus to retrieve desired voice data based on the identification code; and a voice data receiver configured to receive the voice data retrieved by the voice data base apparatus and to output the received voice data through the voice output device.

2. The portable terminal apparatus according to claim 1, wherein:

said frame further comprises a part of the input voice data as a keyword;

said retrieval controller also sends a desired keyword to the voice data base apparatus; and said retrieval command causes the voice data base apparatus to retrieve the desired voice data based on the identification code and the desired keyword.

3. A portable terminal apparatus adapted to be connected through a network to a voice data base apparatus for storing and retrieving voice data, said portable terminal apparatus comprising:

a voice input device;

a voice output device;

a frame processing device configured to create a frame in response to a storage instruction from a user of the portable terminal apparatus and to send the frame to the voice data base apparatus, said frame including voice data input from the voice input device, a keyword of the input voice data, and a storage command for causing the voice data base apparatus to store the input voice data with the keyword;

a retrieval controller configured to send a desired keyword and a retrieval command to the voice data base apparatus in response to a retrieval instruction from the user of the portable terminal apparatus, said retrieval command causing the voice data base apparatus to retrieve desired voice data based on the desired key word; and a voice data receiver configured to receive the voice data retrieved by the voice data base apparatus and to output the received voice data through the voice output device.

4. The portable terminal apparatus according to claim 3, wherein:

said frame further comprises an identification code of the portable terminal apparatus;

said retrieval controller also sends the identification code to the voice data base apparatus; and said retrieval command causes the voice data base apparatus to retrieve the desired voice data based on the identification code and the desired keyword.

5. The portable terminal apparatus according to claim 3, wherein said keyword comprises a part of the input voice data.

6. A portable terminal apparatus adapted to be connected through a network to a voice data base apparatus for storing and retrieving voice data, said portable terminal apparatus comprising:

a voice input device;

a voice output device;

a memory configured to store a predetermined amount of voice data input by the voice input device;

a frame processing device configured to create a frame including the voice data stored in the memory and a storage command for causing the voice data base apparatus to store said voice data every time the memory stores the predetermined amount, and to send the frame to the voice data base apparatus;

a retrieval controller configured to send a retrieval command to the voice data base apparatus in response to a retrieval instruction from a user of the portable terminal apparatus, said retrieval command causing the voice data base apparatus to retrieve desired voice data corresponding to the portable terminal apparatus; and a voice data receiver configured to receive the voice data retrieved by the voice data base apparatus and to output the received voice data through the voice output device.

7. A voice data base apparatus adapted to be connected through a network to a plurality of portable terminal apparatuses which are each configured to issue a storage command, a retrieval command, voice data, a keyword of the voice data, and an identification code, said voice data base apparatus comprising:

a storage controller, responsive to receipt of a storage command from a first one of the portable terminal apparatuses, for storing voice data and a keyword of the voice data received from the first one of the portable terminal apparatuses along with the identification code of the first one of the portable terminal apparatuses;

a retrieval controller, responsive to receipt of a retrieval command from a second one of the portable terminal apparatuses, for retrieving desired voice data based on a desired keyword received from the second one of the portable terminal apparatuses and the identification code of the second one of the portable terminal apparatuses; and a transmission controller configured to transmit voice data retrieved by the retrieval controller to the second one of the portable terminal apparatuses through the network.

8. A recording medium having stored thereon a computer readable program for operating a portable terminal apparatus adapted to be connected through a network to a voice data base apparatus for storing and retrieving voice data, said program comprising:

program code means for causing the portable terminal apparatus to create a frame in response to a storage instruction from a user of the portable terminal apparatus and to send the frame to the voice data base apparatus, said frame including voice data input from a voice input device, an identification code of the portable terminal apparatus, and a storage command for causing the voice data base apparatus to store the input voice data with the identification code;

program code means for causing the portable terminal apparatus to send the identification code and a retrieval command to the voice data base apparatus in response to a retrieval instruction from the user of the portable terminal apparatus, said retrieval command causing the voice data base apparatus to retrieve desired voice data based on the identification code; and program code means for causing the portable terminal apparatus to receive the voice data retrieved by the voice data base apparatus and to output the received voice data through an voice output device.

9. A recording medium having stored thereon a computer readable program for operating a portable terminal apparatus adapted to be connected through a network to a voice data base apparatus for storing and retrieving voice data, said program comprising:

program code means for causing the portable terminal apparatus to create a frame in response to a storage instruction from a user of the portable terminal apparatus and to send the frame to the voice data base apparatus, said frame including voice data input from a voice input device, a keyword of the input voice data, and a storage command for causing the voice data base apparatus to store the input voice data with the keyword;

program code means for causing the portable terminal apparatus to send a desired keyword and a retrieval command to the voice data base apparatus in response to a retrieval instruction from the user of the portable terminal apparatus, said retrieval command causing the voice data base apparatus to retrieve desired voice data based on the desired key word; and program code means for causing the portable terminal apparatus to receive the voice data retrieved by the voice data base apparatus and to output the received voice data through an voice output device.

10. A recording medium having stored thereon a computer readable program for operating a portable terminal apparatus adapted to be connected through a network to a voice data base apparatus for storing and retrieving voice data, said program comprising:

program code means for causing the portable terminal apparatus to store in a memory thereof a predetermined amount of voice data input by a voice input device;

program code means for causing the portable terminal apparatus to create a frame including the voice data stored in the memory and a storage command for causing the voice data base apparatus to store said voice data every time the memory stores the predetermined amount, and to send the frame to the voice data base apparatus;

program code means for causing the portable terminal apparatus to send a retrieval command to the voice data base apparatus in response to a retrieval instruction from a user of the portable terminal apparatus, said retrieval command causing the voice data base apparatus to retrieve desired voice data corresponding to the portable terminal apparatus; and program code means for causing the portable terminal apparatus to receive the voice data retrieved by the voice data base apparatus and to output the received voice data through an voice output device.

11. A recording medium having stored thereon a computer readable program for operating a voice data base apparatus adapted to be connected through a network to a plurality of portable terminal apparatuses which are each configured to issue a storage command, a retrieval command, voice data, a keyword of the voice data, and an identification code, said program comprising:

program code means for causing the voice data base apparatus to, responsive to receipt of a storage command from a first one of the portable terminal apparatuses, store voice data and a keyword of the voice data received from the first one of the portable terminal apparatuses along with the identification code of the first one of the portable terminal apparatuses;

program code means for causing the voice data base apparatus to, responsive to receipt of a retrieval command from a second one of the portable terminal apparatuses, retrieve desired voice data based on a desired keyword received from the second one of the portable terminal apparatuses and the identification code of the second one of the portable terminal apparatuses; and program code means for causing the voice data base apparatus to transmit retrieved voice data to the second one of the portable terminal apparatuses through the network.

* * * * *